United States Patent [19]

Wu

[11] Patent Number: 5,623,032
[45] Date of Patent: Apr. 22, 1997

[54] LOW-VOLATILE AND STRONGLY BASIC TERTIARY AMINO ALCOHOLS AS CATALYST FOR THE MANUFACTURE OF IMPROVED PHENOLIC RESINS

[75] Inventor: Gaoming Wu, Wheeling, Ill.

[73] Assignee: Angus Chemical Company, Buffalo Grove, Ill.

[21] Appl. No.: 493,904

[22] Filed: Jun. 23, 1995

[51] Int. Cl.$^6$ .............................. C08L 8/28; C08L 61/06
[52] U.S. Cl. ...................... 525/491; 528/137; 528/145; 528/147; 528/162; 528/163; 528/164; 528/259; 528/480; 528/491; 528/495; 528/498
[58] Field of Search ...................... 528/137, 145, 528/146, 147, 162, 163, 164, 259; 525/480, 491, 495, 498

[56] References Cited

U.S. PATENT DOCUMENTS

| | | |
|---|---|---|
| 3,428,593 | 2/1969 | Higginbottom et al. . |
| 4,028,367 | 6/1977 | Higginbottom . |
| 4,332,709 | 6/1982 | Kooijmans et al. ............... 523/416 |
| 4,757,108 | 7/1988 | Wallsser . |
| 4,960,826 | 10/1990 | Wallsser . |
| 5,032,431 | 7/1991 | Conner et al. . |
| 5,296,584 | 3/1994 | Walisser . |

FOREIGN PATENT DOCUMENTS

| | | |
|---|---|---|
| 1118926 | 2/1982 | Canada . |
| 2103979 | 5/1994 | Canada . |
| 0253488A2 | 1/1988 | European Pat. Off. . |

*Primary Examiner*—Samuel A. Acquah
*Attorney, Agent, or Firm*—Arnold, White & Durkee

[57] ABSTRACT

A process for preparing ashless and low-ash phenolic resole resins having no amine odor, and a process for preparing storage-stable mixtures or premix solutions of phenol-formaldehyde resin and urea or unrea-formaldehyde resins. These processes react phenol and formaldehyde in the presence of an effective catalytic amount of a low-volatile and strongly basic tertiary amino alcohol either alone or in combination with an inorganic base.

32 Claims, No Drawings

1

LOW-VOLATILE AND STRONGLY BASIC TERTIARY AMINO ALCOHOLS AS CATALYST FOR THE MANUFACTURE OF IMPROVED PHENOLIC RESINS

FIELD OF THE INVENTION

The present invention relates to the preparation of ashless and low ash phenol-formaldehyde resole resins with many improved properties by condensation polymerization of phenol and formaldehyde in the presence of a low-volatile and strongly basic organic catalyst, either alone or in combination with one or more other catalysts. This invention also relates to the preparation of a storage-stable phenolic resin and amino resin mixture system or premix system.

BACKGROUND OF THE INVENTION

As used in the art, the term "resole" refers to phenolic resins that contain useful reactivity, as opposed to cured resins. At this stage, the product is fully soluble in one or more common solvents, such as alcohols and ketones, and is fusible at less than 150° C. Phenol-aldehyde resole resins are generally prepared by reacting a phenol with an excess molar proportion of an aldehyde in the presence of a basic catalyst, such as an alkaline catalyst or an amine catalyst.

Phenolic resole resins are typically made by condensation polymerization of phenol and formaldehyde in the presence of a catalyst at temperatures between 40° C. and 100° C. Due to the low yield of the phenol and formaldehyde condensation under the reaction conditions that are normally used, a typical resole resin contains a high percentage of free monomers, i.e., phenol and formaldehyde. These free monomers are volatile and highly toxic. Reducing the level of free monomers in such resins, thus reducing their emissions into the environment during application processes, has been one of the most heavily researched areas by both phenolic resin producers and resin users for many years. The catalysts commonly used in phenolic resin production are sodium hydroxide and triethylamine ("TEA"). TEA is very volatile and toxic. Its emission into the atmosphere is regulated by government agencies.

Phenolic resins are widely used as binders in the fiberglass industry. Most resins for the fiberglass industry are catalyzed with inorganic catalysts because of their low cost and non-volatility. When an inorganic base-catalyzed phenolic resin is mixed with urea solution (known in the art as "premix" or "pre-react"), certain components of the phenolic resin, known as "tetradimers," crystallize out, causing the blockage of lines, interrupting normal operations, and reducing resin use efficiency. The crystallized material is difficult to dissolve and hinders uniform application of the resin to the glass fiber. Due to the very poor tetradimer stability of the premix solutions of inorganic base-catalyzed resins and urea, vigorous precautions must be taken with the inorganic base-catalyzed resins, to avoid tetradimer crystal growth, for example, by regular cleaning of the storage tanks and lines, and by shortening the time between the preparation and use of the premix solution.

Phenolic resins catalyzed with an organic catalyst such as TEA are especially useful for applications where high moisture resistance and higher physical strength are required. When a phenolic resin such as phenol-formaldehyde resin ("PF") catalyzed with an organic catalyst is mixed with an amino resin such as urea-formaldehyde resin ("UF"), the resultant PF/UF or PF/U is expected to be much more storage stable and to have much less tetradimer precipitation or crystallization since the organic catalyst, unlike an inorganic base, will increase the solubility of the phenolic resin in the PF/UF solution. PF/UF mixture or premix is often used as a binder in the fiberglass industry. However, the benefit of a storage-stable, highly moisture-resistant and high quality premix system with a typical organic catalyst such as TEA cannot be realized due to its high volatility and toxicity.

A typical phenolic resin to be used as a binder for fiberglass is made at a formaldehyde/phenol mole ratio as high as six to virtually eliminate free phenol in the resin. The high formaldehyde/phenol ratio required to achieve the very low free phenol concentration results in free formaldehyde concentrations as high as 20%. The high percentage of free formaldehyde in the resin must be scavenged by the addition of a large amount of urea or any other formaldehyde scavengers.

In the fiberglass industry, a phenolic resin is normally produced by a resin manufacturer, and then is sold to a fiberglass producer. The addition of urea to the phenolic resin to form UF resin is done in the fiberglass plant. When the urea is added in a fiberglass plant, the level of free formaldehyde is reduced to about 0.5–1.5% after the PF/U premix is allowed to react at room temperature for a few hours. Often urea cannot be added to the phenolic resin in the resin manufacturer's site because the mixture of phenolic resin and urea (the "premix") is not stable enough to permit it to be stored for two to three weeks without tetradimer precipitation. Consequently, most phenolic fiberglass resins are sold without any added urea.

If it were possible to produce a phenolic resin which is highly storage stable without any precipitation for two to three weeks, without the use of a volatile and toxic catalyst, it would be possible to add the formaldehyde scavenger in the resin producer's site. Such a PF/UF premix system would be attractive to fiberglass manufacturers because it would reduce storage facility requirements, as well as the manpower needed for handling, maintaining and purchasing the materials used in the premix. Perhaps most importantly, such a premix system would eliminate the need to handle materials with free formaldehyde concentrations as high as 20%, and formaldehyde emissions would also be reduced.

If the resin manufacturer adds all the urea to the phenolic resin in a premix system, it is normally many days before the resin is used in the fiberglass plant. During this time, virtually all the free formaldehyde in the resin reacts with the added urea. By the time the premix is used in the fiberglass plant, the free formaldehyde content in the premix can be as low as 0.1%. Thus, the use of such a ready-for-sale premix system reduces the emissions of free monomers.

A ready-for-sale premix system can also reduce the free monomer concentrations in the resin and attendant emissions by permitting further advancement of the resin polymerization. Since the PF/U premix of a typical resin presently available in the art has poor storage stability, the phenolic resin is often slightly under-cooked to maintain low molecular weight and acceptable storage stability. A resin catalyzed with an organic catalyst may still have excellent storage stability at a slightly higher advancement or higher molecular weights. Therefore, it will be possible to advance the resin to lower the contents of free monomers in the resin, which in turn reduces monomer emissions.

In summary, tetradimer precipitation and emissions of phenol, formaldehyde and amine remain the most important issues in the phenolic fiberglass industry. Although most widely used, inorganic base-catalyzed resins have poor tetradimer stability, low moisture resistance, low physical strength, and are not suitable for ready-for-sale premix production. Resins catalyzed with an organic catalyst should have excellent storage stability when mixed with a high level of urea, high moisture resistance, high physical strength, and permit ready-for-sale premix production by the resin manufacturer, but a typical organic catalyst such as TEA being highly volatile and toxic may not be suitable for a wide range of applications.

SUMMARY OF THE INVENTION

It is a primary object of the present invention to provide an improved catalyst for the condensation polymerization of phenol and formaldehyde. A more specific object is to provide such a catalyst which is organic and has low volatility and thus reduces amine emissions.

It is another object of the present invention to provide an improved phenol-formaldehyde resole resin which produces a storage-stable mixture with urea or formaldehyde resins, without any significant amine emissions. In this connection, a more specific object of the invention is to provide such an improved phenol-formaldehyde resole resin which, when mixed with a large amount of urea, can be stored for long periods without exhibiting crystal growth or precipitation and without any significant amine emissions.

A further object of this invention is to provide such an improved phenol-formaldehyde resole resin which can be mixed with urea to form a premix system at the point of resin manufacture, to allow for a more complete reaction between the urea and free formaldehyde in the resin, thus reducing formaldehyde emissions.

A still further object of this invention is to provide an improved method of preparing such a phenol-formaldehyde resole resin which is ashless and provides the high moisture resistance and high physical strength that are characteristic of such resins prepared with organic catalysts.

It is yet another object of the present invention to provide an improved catalyst which acts as a solvent or plasticizer and increases the flow of the hot resin melt at temperatures higher than 100° C., thereby increasing the resin efficiency and yielding a stronger bond with materials such as fiberglass that are integrated with the resin.

It is another object of this invention to provide an improved phenol-formaldehyde resole resin produced by a catalyzed condensation polymerization and in which the catalyst is chemically bound to the polymeric matrix in the final cured product, thereby avoiding any amine catalyst emissions.

A further object of this invention is to provide an improved phenol-formaldehyde resole resin which has little or no color, so that it can be readily pigmented to achieve the desired color for the final product in which it is used.

Other objects and advantages of the invention will be apparent from the following detailed description and the illustrative examples.

In accordance with the present invention, the foregoing objectives are realized by preparing a phenol-formaldehyde resole resin by reacting phenol or a phenol derivative and formaldehyde or a formaldehyde derivative in the presence of an effective catalytic amount of a tertiary amino alcohol. The tertiary amino alcohol preferably has the structure

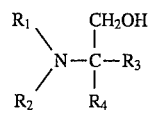

in which $R_1$ and $R_2$ are, individually, a branched or straight chain alkyl group, and $R_3$ and $R_4$ are, individually, selected from the group consisting of a hydrogen atom, a hydroxyl group, a branched or straight chain alkyl group, and a branched or straight chain hydroxyl alkyl group.

Thus, the catalyst may be a mono-, di-, or tri- alcohol. The preferred alkyl groups for the $R_1$ and $R_2$ substituents are methyl groups. The $R_3$ and $R_4$ substituents are preferably either a methyl group, a hydroxymethyl group or propanol. The alkyl groups preferably have from one to five carbons. Particularly preferred catalysts are 2-dimethylamino-2-methyl-1-propanol and 2-(dimethylamino)-2-(hydroxymethyl)-1,3-propanediol.

Derivatives of phenol that are suitable for use in this invention include bisphenol A, bisphenol B, resorcinol, cresols, and xylenols.

Derivatives of formaldehyde that are suitable for use in this invention include paraformaldehyde, acetaldehyde, propionaldehyde, butyraldehyde and glyoxal, trioxane, furfural, or furfurol.

DETAILED DESCRIPTION OF PREFERRED EMBODIMENTS

While the invention will be described in connection with certain preferred embodiments, it is not intended to limit the invention to the preferred embodiments. On the contrary, it is intended to cover all alternatives, modifications, and equivalents as may be included within the spirit and scope of the invention as defined by the appended claims.

The condensation polymerization of phenol and formaldehyde is typically carried out at a temperature in the range from about 30° C. to about 110° C., over a reaction time of about 1 hour to about 20 hours, using a mole ratio of formaldehyde to phenol in the range from about 1 to about 6. The tertiary amino alcohol catalyst of this invention is preferably present in an amount in the range from about 1 percent to about 20 percent of the combined weight of the phenol and formaldehyde in the reaction mixture.

The catalyzed reaction is preferably carried out in an aqueous solution, as is typical for condensation polymerization of phenol-formaldehyde resins. The tertiary amino alcohol should be readily soluble in water because the reaction mixture can contain as much as 50% water at the beginning of the polymerization. The tertiary amino alcohol should also be reasonably mixable with the phenolic resin so that the amine remains in the same phase as the resin in the curing stage when all the water has been evaporated and only organic phenolic resin remains. The tertiary amino alcohol preferably has a boiling point as high as possible, preferably above 250° C., so that it remains in the resin system without causing emissions at temperatures as high as 200° C. An ideal catalyst is one which can bond chemically to the polymer matrix at the curing stage.

The tertiary amino alcohol should be a strong base to effectively catalyze the phenol-formaldehyde condensation. It is preferred that any electron-withdrawing group such as hydroxyl groups be as far away from the nitrogen group as possible, since any electron-withdrawing group located too close to the nitrogen atom will reduce the electron density of the nitrogen group and thereby reduce the basicity of the amine. The physical size of the three groups attached to the nitrogen group is preferably small to maintain high basicity and to allow for easy access by phenol molecules in the catalytic process.

The tertiary amino alcohols of this invention have been found to be very effective catalysts for the condensation polymerization of phenol and formaldehyde, and yet they are essentially non-volatile so that attendant amine emissions are negligible. Because the tertiary amino alcohols are organic catalysts, they produce resins which are essentially ashless, and thus are particularly useful in the manufacture of resins suitable for use in a wide range of industries such as in fiberglass manufacturing. Moreover, the resulting phenol-formaldehyde resole resin is characterized by the high moisture resistance and high physical strength of resins produced with the use of organic rather than inorganic catalysts. These organic catalysts also produce phenol-formaldehyde resole resins having superior tetradimer storage stability, when mixed with a formaldehyde scavenger such as urea.

The tertiary amino alcohol may be used alone as the catalyst, or it may be used in combination with one or more other catalysts, either organic or inorganic. For example, the tertiary amino alcohol may be used in combination with an alkali metal hydroxide such as sodium hydroxide or potassium hydroxide, calcium hydroxide or barium hydroxide.

The tertiary amino alcohol catalyst remains in the resulting reaction product, and at least a portion of the catalyst becomes chemically bound to the polymeric matrix in the resole resin. It has been found that the presence of the hydroxyl functionality on each amino alcohol molecule acts as a plasticizer and increases the flow of the hot resin melt, thereby increasing the resin efficiency and yielding a stronger bond of the resin with materials which are integrated with the resin, such as fiberglass. The chemical bonding of the catalyst to the polymeric matrix also further inhibits catalyst emissions in the finished product.

It has also been found that the phenol-formaldehyde resole resins produced by the process of this invention are particularly useful in the preparation of premix systems containing both phenolic resins and amino resins such as urea-formaldehyde resins. As discussed previously, it is desirable that such premix systems be prepared at the point of manufacture of the resin, to allow for a more complete reaction between the free formaldehyde in the resin and the urea, which in turn reduces formaldehyde emissions. It is believed that the hydrophilic hydroxyl functionality of the amino alcohol molecules provides an effective solvent which helps to solubilize the resin in the premix, thus increasing the stability of these solutions.

The following examples are set forth to illustrate the principles and practices of the present invention to one skilled in the art. They are not intended to be restrictive but merely to be illustrative of the invention. Unless otherwise stated, all parts, percentages and ratios are on a weight basis.

EXAMPLE 1

Phenol (99%, 211 g), formaldehyde (43.3%, 410 g), sodium hydroxide (50%, 22.8 g) and water (63 g) were charged to a flask and allowed to react at 50° C. for 3 hours, then reacted at 60° C. until a salt tolerance of 700% was attained. The resulting resin, designated as Resin 1, was tested for water tolerance, salt tolerance, free formaldehyde, free phenol, pH and solids content as described at the end of the examples. The measured properties are summarized in Table 1. Sodium hydroxide is a typical inorganic catalyst used by the phenolic industry for the manufacture of phenolic resin. This example was done to serve as a reference for the following examples.

EXAMPLE 2

Phenol (99%, 211 g), formaldehyde (43.3%, 410 g), triethylamine (99%, 32.6 g) and water (53 g) were charged to a flask and allowed to react at 50° C. for 3 hours, then reacted at 60° C. until a salt tolerance of 700% was attained. The resulting resin, designated as Resin 2, was tested for water tolerance, salt tolerance, free formaldehyde, free phenol, pH and solids content. The measured properties are summarized in Table 1. Triethylamine is a highly volatile and toxic organic catalyst also used by the phenolic industry. This example was done also to serve as a reference for comparisons with the following examples.

EXAMPLE 3

Phenol (99%, 211 g), formaldehyde (43.3%, 410 g), 2-dimethylamino-2-methyl-1-propanol (DMAMP-80™, Angus Chemical Company) (80% in water, 41 g), sodium hydroxide (50%, 1.3 g), and water (42 g) were charged to a flask and allowed to react at 50° C. for 3 hours, then reacted at 60° C. until a salt tolerance of 300% was attained. The resulting resin, designated as Resin 3, was tested for water tolerance, salt tolerance, free formaldehyde, free phenol, pH and solids content. The measured properties are summarized in Table 1. DMAMP-80™ is a strongly basic tertiary amino alcohol with a pka of 10.2. It was used with a very small amount of sodium hydroxide (0.1%). It can be seen that on a equal weight basis DMAMP-80™ can catalyze the condensation polymerization of phenol and formaldehyde as effectively as TEA (Example 2), a typical organic catalyst.

EXAMPLE 4

Phenol (99%, 105.5 g), formaldehyde 48.8%, 182 g), 2-(dimethylamino)-2-(hydroxymethyl)-1,3-propanediol designated as DMTA (93%, 25.9 g), sodium hydroxide (50%, 0.7 g), and water 39 g) were charged to a flask and allowed to react at 50° C. for 3 hours, then reacted at 600° C. until a salt tolerance of 600% was attained. The resulting resin, designated as Resin 4, was tested for water tolerance, salt tolerance, free formaldehyde, free phenol, pH and solids content. The measured properties are summarized in Table 1. DMTA is another example of a strongly basic tertiary amino alcohol. It has a boiling point higher than 230° C. On an equal mole basis, DMTA is as effective a catalyst as TEA (Example 2). The higher solids content of Resin 4 was probably indicative of the low or non-volatility of DMTA. Such property shall be highly desired by the phenolic industry.

EXAMPLE 5

Phenol (99%, 160 g), formaldehyde (48.8%, 439 g), 2-(dimethylamino)-2-(hydroxymethyl)-1,3-propanediol (93%, 24 g), sodium hydroxide (50%, 1.5 g), and water (36 g) were charged to a flask and allowed to react at 50° C. for 3 hours, then reacted at 60° C. until a salt tolerance of 600% was attained. The resulting resin, designated as Resin 5, was tested for water tolerance, salt tolerance, free formaldehyde, free phenol, pH and solids content. The measured properties are summarized in Table 1. This example demonstrated that DMTA can effectively catalyze phenol-formaldehyde condensation at a higher formaldehyde/phenol mole ratio. As the mole ratio was increased to 4.2 from 2.6 in Examples 1–4, the free phenol of Resin 5 dropped to 0.3%.

EXAMPLE 6

Phenol (99%, 160 g), formaldehyde (48.8%, 439 g) 2-(dimethylamino)-2-(hydroxymethyl)-1,3-propanediol (93%, 19 g), sodium hydroxide (50%, 5.6 g), and water (29 g) were charged to a flask and allowed to react at 50° C. for 3 hours, then reacted at 60° C. until a salt tolerance of 700% was attained. The resulting resin, designated as Resin 6, was tested for water tolerance, salt tolerance, free formaldehyde, free phenol, pH and solids content. The measured properties are summarized in Table 1. In this example, the amount of DMTA was decreased from 3.4% to 2.7%, and the amount of NaOH was increased from 0.1% to 0.4%. This demonstrated the feasibility of using a combination of DMTA and sodium hydroxide for the catalysis.

EXAMPLE 7

Phenol (99%, 105.5 g), formaldehyde 48.8%, 182 g), 2-(dimethylamino)-2-hydroxymethyl)-1,3-propanediol (93%, 25.9 g), sodium hydroxide (50%, 0.7 g), and water (39 g) were charged to a flask and allowed to react at 50° C. for 3 hours, then reacted at 60° C. until a salt tolerance of 300% was attained. The resulting resin, designated as Resin 7, was tested for water tolerance, salt tolerance, free formaldehyde, free phenol, pH and solids content. The measured properties are summarized in Table 1. This example was the same as Example 6 except this resin was advanced slightly further than Example 6, as indicated by its decreased salt tolerance. As the resin was further advanced, its free monomer contents deceased further.

EXAMPLE 8

Resin 1 (19 g) was mixed with urea (50%, 4.1 g) at room temperature, and then seeded with 0.01 g of tetradimer seeds, i.e., [bis(4-hydroxy-3,5-dimethylophenyl)methane]. This mixture, designated as PF/U Premix #1, was then stored at 20°–25° C. Serious tetradimer crystal growth or precipitation was observed within 2 days of storage. Therefore, there was serious tetradimer crystal growth during storage in the mixture of an inorganic catalyst-catalyzed PF resin and urea. This can cause various problems in application processes.

EXAMPLES 9–15

Example 8 was repeated six more times, using Resins 2 through 7 in place of Resin 1. The amount of each component for the preparation of these solutions is given in Table 2. After 20 days of storage, no tetradimer crystal growth or precipitation was observed for any of these organic catalyst-catalyzed resins. Therefore, no crystal growth occurs during storage in these mixtures of an organic catalyst-catalyzed PF resin and urea. These crystal-free, storage-stable systems can be greatly advantageous for the applications of these systems. The two amino alcohol, i.e. DMAMP-80™ and DMTA, are highly basic organic bases. A comparison of the pH of 0.010N solutions of these amino alcohols along with that of triethylamine is as follows:

| AMINE | pH of 0.010 N Aqueous Solutions |
|---|---|
| TEA | 10.8 |
| DMTA | 10.7 |
| DMAMP-80 | 10.6 |

Therefore, DMTA and DMAMP-80 are as basic as TEA.

It is significant that the premix solution of Resin 7 (PF/U Premix 14 in Example 14) was as storage stable as that of Resin 6. The further advancement in the molecular weight of the polymer in Example 7 as compared to all the other resins still maintained its excellent storage stability. This can help to reduce free monomers in the resin and emissions.

EXAMPLE 16

Resin 5 (97 g) at 40° C. was mixed with urea (50%, 65 g), maintained at 35°–40° C. for 30 mins., and then cooled down. This phenolic resin and urea mixture, i.e., a PF/U premix, was measured to have a pH of 8.5, water tolerance of higher than 50 times, and solids of 43.1%. When this PF/U premix (40 g) was seeded with 0.01 g tetradimer seeds and stored at 20°–25° C. for 20 days, there was no crystal growth. This example demonstrated the possibility of preparing a storage-stable and precipitation-free one-component PF/U mixture of DMTA-catalyzed PF resin and urea at the PF manufacturing site. The use of a low level of sodium hydroxide in combination with DMTA still maintained a good storage stability of the product. This may be helpful to formulate catalyst compositions for any particular product.

EXAMPLE 17

Resin 3 (25 g) was mixed with urea solution (50%, 10 g) and kept at room temperature for 5 hours. Ammonium sulfate (0.67 g) was added, and dissolved. When this solution was injected to a gas chromatograph ("GC") set-up, no peak of 2-dimethylamino-2-(hydroxymethyl)-1,3-propanediol catalyst was observed, while pure DMTA peak was at 14 mins under the same conditions. Therefore, the amino alcohol catalyst DMTA in the resin solution was found to be non-volatile in this solution.

In summary, the amino alcohols DMTA and DMAMP of these examples are highly basic, non-volatile, and improve the storage stability of the mixture of PF resin and urea.

TABLE 1

A Summary of the Properties of the Phenolic Resins Produced in Examples 1 through 7.

| Resin Name | Resin 1 | Resin 2 | Resin 3 | Resin 4 | Resin 5 | Resin 6 | Resin 7 |
|---|---|---|---|---|---|---|---|
| Catalyst | NaOH | TEA | DMAMP | DMTA | DMTA | DMTA | DMTA |
| Formaldehyde/phenol Mole Ratio | 2.6 | 2.6 | 2.6 | 2.6 | 4.2 | 4.2 | 4.2 |

TABLE 1-continued

A Summary of the Properties of the Phenolic Resins Produced in Examples 1 through 7.

| Resin Name | Resin 1 | Resin 2 | Resin 3 | Resin 4 | Resin 5 | Resin 6 | Resin 7 |
|---|---|---|---|---|---|---|---|
| Main Catalyst/ Total Resin Liquid (%, g/g) | 1.6 | 4.6 | 4.7 | 6.8 | 3.4 | 2.7 | 2.7 |
| Co-catalyst/ Total Resin Liquid (%, g/g) | | | 0.09 NaOH | 0.10 NaOH | 0.10 NaOH | 0.43 NaOH | 0.43 NaOH |
| Water Tolerance (at 25° C., Times) | >50 | >50 | >50 | >50 | >50 | >50 | >50 |
| Salt Tolerance* in 10% NaCL (at 25° C., Times) | 7 | 7 | 3 | 6 | 6 | 7 | 3 |
| Free Formaldehyde (%) | 4.8 | 5.9 | 4.9 | 5.1 | 14.4 | 14.2 | 13.9 |
| Free Phenol (%) | 0.7 | 1.2 | 1.0 | 1.3 | 0.3 | 0.2 | 0.1 |
| pH (25° C.) | 9.3 | 8.9 | 8.9 | 8.7 | 8.4 | 8.7 | 8.7 |
| Solids % (2g/150° C./2 hr.) | 46% | 46% | 47% | 49% | 42% | 42% | 43% |

*Indication of the solubility of the resin in 10% sodium chloride solution. The higher the number, the less advanced the resin is.

TABLE 2

Composition of PF/U Premix Solutions.

| PF/U Premix # | Resin Type | Free Formaldehyde % of Resin | Resin Amount (g) | 50% Urea Amount (g) |
|---|---|---|---|---|
| PF/U Premix 1 | Resin 1 | 4.8 | 19 | 4.1 |
| PF/U Premix 2 | Resin 2 | 5.9 | 19 | 5.0 |
| PF/U Premix 3 | Resin 3 | 5.6 | 19 | 4.7 |
| PF/U Premix 4 | Resin 4 | 7.5 | 19 | 6.2 |
| PF/U Premix 5 | Resin 5 | 5.1 | 19 | 4.2 |
| PF/U Premix 6 | Resin 6 | 14.4 | 19 | 11.9 |
| PF/U Premix 7 | Resin 7 | 14.2 | 19 | 11.7 |

The following procedures were used to measure the above properties:

Water tolerance: Distilled water at 25° C. (y g) was gradually added to 10 g resin until the resin solution turned hazy. Water tolerance was obtained by dividing y by 10. The water tolerance number of a resin is an indication of the mixability of the resin with water. It is an important parameter for resin used in fiberglass binders since the phenolic resin is normally diluted with water to a concentration as low as 2%. Maintaining a clear solution and without phase separation at such dilution is essential for a trouble-free processing and for high quality film properties. Typically a water tolerance of 25 times is required. The higher the water tolerance of the resin, the lower the molecular weight of the resin.

Salt tolerance: For the salt tolerance test, a 10% sodium chloride solution (x g) was added to the phenolic resin solution (10 g) gradually until the resin solution turned hazy. Salt tolerance was obtained by dividing x by 10. This is another method to measure the ability of the resin to mix with water and remain clear without precipitation, similar to water tolerance except more stringent.

Free phenol: It was measured by gas chromatography commonly used in the phenolic industry. It is the amount of formaldehyde in the resin at the end of synthesis. A lower number is preferred for increased resin efficiency and lower emissions.

Free formaldehyde: It was measured by commonly used hydroxylamine titration method. This is the amount of formaldehyde left unreacted with phenol in the resin at the end of synthesis. A lower number is preferred for higher resin use efficiency and lower emissions.

pH: It measures the basicity of the resin. A certain basic pH is preferably maintained for the resin to be free of precipitation and to have a high water tolerance.

Solids %: It measures the concentration of phenolic resin part which is not evaporable at the temperature of the test for the duration of the test. Phenolic resin (2 g) in an aluminum dish was kept in a 150° C. oven for two hours. Solids content was obtained by dividing the weight of the resin left unevaporated by the weight of the original resin.

I claim:

1. A process for preparing phenolic resole resins by condensation polymerization of phenol and formaldehyde, said process comprising reacting phenol or a phenol derivative and formaldehyde or a formaldehyde derivative in the presence of an effective catalytic amount of a tertiary amino alcohol.

2. The process of claim 1 wherein said tertiary amino alcohol has the structure

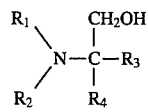

in which $R_1$ and $R_2$ are, individually, a branched or straight chain alkyl group having from one to five carbons, and $R_3$ and $R_4$ are, individually, selected from the group consisting of a hydrogen atom, a hydroxyl group, a branched or straight chain alkyl group having from one to five carbons, and a branched or straight chain hydroxyl alkyl group having from one to five carbons.

3. The process of claim 1 wherein the tertiary amino alcohol is selected from the group consisting of 2-dimethylamino-2-methyl-1-propanol and 2-(dimethylamino)-2-(hydroxymethyl)-1,3-propanediol.

4. The process of claim 1 wherein the tertiary amino alcohol is present in combination with an alkali metal hydroxide.

5. The process of claim 1 wherein the tertiary amino alcohol is soluble in water.

6. The process of claim 1 wherein the tertiary amino alcohol has a boiling point above about 250° C.

7. The process of claim 1 wherein the tertiary amino alcohol is present in an amount between about 1% and about 20% of the combined weight of phenol and formaldehyde in the reaction mixture.

8. A phenol formaldehyde resole resin comprising the reaction product of condensation polymerization of phenol and formaldehyde in the presence of an effective catalytic amount of a tertiary amino alcohol.

9. The phenol-formaldehyde resole resin of claim 8 wherein said tertiary amino alcohol has the structure

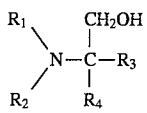

in which $R_1$ and $R_2$ are, individually, a branched or straight chain alkyl group having from one to five carbons, and $R_3$ and $R_4$ are, individually, selected from the group consisting of a hydrogen atom, a hydroxyl group, a branched or straight chain alkyl group having from one to five carbons, and a branched or straight chain hydroxyl alkyl group having from one to five carbons.

10. The phenol-formaldehyde resole resin of claim 8 wherein the tertiary amino alcohol is selected from the group consisting of 2-dimethylamino-2-methyl-1-propanol and 2-(dimethylamino)-2-(hydroxymethyl)-1,3-propanediol.

11. The phenol-formaldehyde resole resin of claim 8 wherein the tertiary amino alcohol is present in combination with an alkali metal hydroxide.

12. The phenol-formaldehyde resole resin of claim 8 wherein the tertiary amino alcohol is soluble in water.

13. The phenol-formaldehyde resole resin of claim 8 wherein the tertiary amino alcohol has a boiling point above about 250° C.

14. The phenol-formaldehyde resole resin of claim 8 wherein the tertiary amino alcohol is present in an amount between about 1% and about 20% of the combined weight of phenol and formaldehyde in the reaction mixture.

15. A phenol-formaldehyde resin and urea or urea-formaldehyde resin premix comprising a solution of a urea or urea-formaldehyde resin and the reaction product of condensation polymerization of phenol and formaldehyde in the presence of an effective catalytic amount of a tertiary amino alcohol.

16. The phenol-formaldehyde resin and urea or urea-formaldehyde premix of claim 15 wherein said tertiary amino alcohol has the structure

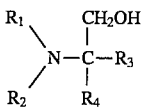

in which $R_1$ and $R_2$ are, individually, a branched or straight chain alkyl group having from one to five carbons, and $R_3$ and $R_4$ are, individually, selected from the group consisting of a hydrogen atom, a hydroxyl group, a branched or straight chain alkyl group having from one to five carbons, and a branched or straight chain hydroxyl alkyl group having from one to five carbons.

17. The phenol-formaldehyde resin and urea or urea-formaldehyde premix of claim 15 wherein the tertiary amino alcohol is selected from the group consisting of 2-dimethylamino-2-methyl-1-propanol and 2-(dimethylamino)-2-(hydroxymethyl)-1,3-propanediol.

18. The phenol-formaldehyde resin and urea or urea-formaldehyde premix of claim 15 wherein the tertiary amino alcohol is present in combination with an alkali metal hydroxide.

19. The phenol-formaldehyde resin and urea or urea-formaldehyde premix of claim 15 wherein the tertiary amino alcohol is soluble in water.

20. The phenol-formaldehyde resin and urea or urea-formaldehyde premix of claim 15 wherein the tertiary amino alcohol has a boiling point above about 250° C.

21. The phenol-formaldehyde resin and urea or urea-formaldehyde premix of claim 15 wherein the tertiary amino alcohol is present in an amount between about 1% and about 20% of the combined weight of phenol and formaldehyde in the reaction mixture.

22. A phenol-formaldehyde resole resin comprising the reaction product of condensation polymerization of phenol and formaldehyde chemically bound with a tertiary amino alcohol.

23. The phenol-formaldehyde resole resin of claim 22 wherein said tertiary amino alcohol has the structure

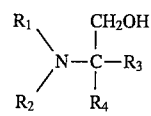

in which $R_1$ and $R_2$ are, individually, a branched or straight chain alkyl group having from one to five carbons, and $R_3$ and $R_4$ are, individually, selected from the group consisting of a hydrogen atom, a hydroxyl group, a branched or straight chain alkyl group having from one to five carbons, and a branched or straight chain hydroxyl alkyl group having from one to five carbons.

24. The phenol-formaldehyde resole resin of claim 22 wherein the tertiary amino alcohol is selected from the group consisting of 2-dimethylamino-2-methyl-1-propanol and 2-(dimethylamino)-2-(hydroxymethyl)-1,3-propanediol.

25. The phenol-formaldehyde resole resin of claim 22 wherein the tertiary amino alcohol is present in combination with an alkali metal hydroxide.

26. The phenol-formaldehyde resole resin of claim 22 wherein the tertiary amino alcohol is soluble in water.

27. The phenol-formaldehyde resole resin of claim 22 wherein the tertiary amino alcohol has a boiling point above about 250° C.

28. The phenol-formaldehyde resole resin of claim 22 wherein the tertiary amino alcohol is present in an amount between about 1% and about 20% of the combined weight of phenol and formaldehyde in the reaction mixture.

29. The process of claim 2 wherein $R_1$ and $R_2$ are methyl and $R_3$ and $R_4$ are chosen from the group consisting of methyl, hydroxymethyl, and propanol.

30. The phenol-formaldehyde resole resin of claim 9 wherein $R_1$ and $R_2$ are methyl and $R_3$ and $R_4$ are chosen from the group consisting of methyl, hydroxymethyl, and propanol.

31. The phenol-formaldehyde resin and urea or urea-formaldehyde premix of claim 16 wherein $R_1$ and $R_2$ are methyl and $R_3$ and $R_4$ are chosen from the group consisting of methyl, hydroxymethyl, and propanol.

32. The phenol-formaldehyde resole resin of claim 23 wherein $R_1$ and $R_2$ are methyl and $R_3$ and $R_4$ are chosen from the group consisting of methyl, hydroxymethyl, and propanol.

* * * * *